United States Patent
Kim et al.

(10) Patent No.: US 9,761,845 B2
(45) Date of Patent: Sep. 12, 2017

(54) SECONDARY BATTERY

(71) Applicant: SAMSUNG SDI CO., LTD., Yongin-si, Gyeonggi-do (KR)

(72) Inventors: Daekyu Kim, Yongin-si (KR); Jieun Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 205 days.

(21) Appl. No.: 14/171,744

(22) Filed: Feb. 3, 2014

(65) Prior Publication Data

US 2015/0104684 A1    Apr. 16, 2015

(30) Foreign Application Priority Data

Oct. 16, 2013  (KR) ........................ 10-2013-0123295

(51) Int. Cl.
*H01M 2/24* (2006.01)
*H01M 2/02* (2006.01)
(Continued)

(52) U.S. Cl.
CPC ......... *H01M 2/0202* (2013.01); *H01M 2/024* (2013.01); *H01M 2/029* (2013.01); *H01M 2/0275* (2013.01); *H01M 2/0287* (2013.01); *H01M 2/1022* (2013.01); *H01M 2/347* (2013.01); *H01M 10/0431* (2013.01); *H01M 10/0436* (2013.01); *H01M 2/021* (2013.01); *H01M 2/026* (2013.01);
(Continued)

(58) Field of Classification Search
None
See application file for complete search history.

(56) References Cited

U.S. PATENT DOCUMENTS

2006/0251962 A1   11/2006  Kim
2011/0064995 A1    3/2011  Kim
(Continued)

FOREIGN PATENT DOCUMENTS

EP    2 254 187 A1   11/2010
EP    2 267 830 A1   12/2010
(Continued)

OTHER PUBLICATIONS

English machine translation of Japanese Publication No. JP 2004-014395, dated Jan. 15, 2004, 23 pages.
(Continued)

*Primary Examiner* — Tracy Dove
(74) *Attorney, Agent, or Firm* — Lewis Roca Rothgerber Christie LLP

(57) ABSTRACT

Provided are a finishing tape, which can prevent a short circuit while preventing impacts applied to an electrode assembly, and a secondary battery including the same. The secondary battery includes a case having an opening defining an internal space, an electrode assembly in the internal space of the case, and a cap assembly coupled to the opening of the case sealing the case. The electrode assembly may include a finishing tape on an outer surface of the electrode assembly between the case and the electrode assembly. The finishing tape may include a first substrate and a second substrate. The cap assembly may include a cap plate coupled to the opening of the case. The secondary battery may further include an insulation case between the electrode assembly and the cap assembly.

16 Claims, 3 Drawing Sheets

(51) Int. Cl.
*H01M 10/04* (2006.01)
*H01M 2/10* (2006.01)
*H01M 2/34* (2006.01)
H01M 10/0525 (2010.01)
H01M 10/0587 (2010.01)

(52) U.S. Cl.
CPC ........ *H01M 2/0217* (2013.01); *H01M 2/1061* (2013.01); *H01M 10/0525* (2013.01); *H01M 10/0587* (2013.01); *H01M 2002/0297* (2013.01)

(56) References Cited

U.S. PATENT DOCUMENTS

2012/0023739 A1  2/2012  Kim
2013/0202932 A1  8/2013  Song et al.

FOREIGN PATENT DOCUMENTS

| EP | 2 273 601 A1 | 1/2011 |
| EP | 2 375 472 A1 | 10/2011 |
| EP | 2 477 252 A1 | 7/2012 |
| JP | 2004-014395 | 1/2004 |
| KR | 10-2004-0042375 | 5/2004 |
| KR | 10-2011-0028200 | 3/2011 |

OTHER PUBLICATIONS

EPO Search Report dated Mar. 18, 2015, for corresponding European Patent application 14152098.1, (8 pages).

SECONDARY BATTERY

CROSS-REFERENCE TO RELATED APPLICATION

This application claims priority to and the benefit of Korean Patent Application No. 10-2013-0123295, filed in the Korean Intellectual Property Office on Oct. 16, 2013, the entire contents of which is incorporated herein by reference.

BACKGROUND

1. Field

Aspects of the present invention relate to a secondary battery.

2. Description of the Related Art

In general, secondary batteries are rechargeable, in contrast to primary batteries, which are not rechargeable once discharged. Secondary batteries are widely used in various applications including advanced electronic devices such as cellular phones, notebook computers, camcorders, etc.

Lithium secondary batteries operating at 3.6 V are rapidly replacing nickel-cadmium (Ni—Cd) batteries or nickel-hydride (Ni-MH) batteries, which have widely been used as power sources for electronic devices, because the operating voltage of these lithium secondary batteries is approximately three-times higher than that of nickel-cadmium (Ni—Cd) batteries or nickel-hydride (Ni-MH) batteries. Lithium secondary batteries also have excellent energy density per unit weight.

Lithium secondary batteries generally employ a lithium oxide positive active material, and a carbon negative active material. Such lithium secondary batteries may be classified as liquid electrolyte cells or polymer electrolyte cells based on the kind of electrolyte used. Lithium batteries using a liquid electrolyte are generally referred to as lithium-ion batteries, and lithium batteries using a polymer electrolyte are generally referred to as lithium-polymer batteries. Typically, lithium secondary batteries are manufactured in cylindrical, rectangular, or pouch-type shapes.

In typical lithium secondary batteries, an electrode assembly is inserted into a case together with the electrolyte or electrolytic solution. However, the electrode assembly within the case is often susceptible to being damaged due to external impacts on the secondary battery or case. Accordingly, secondary batteries are often subject to short circuits or other safety concerns resulting from these external impacts.

SUMMARY

Aspects of the present invention relate to a secondary battery, and more particularly, to a secondary battery capable of minimizing impacts to an electrode assembly of the battery resulting in the prevention of a short circuit or other safety concerns.

In accordance with one aspect of the present invention, a secondary battery includes a case having an opening defining an internal space, an electrode assembly in the internal space of the case, and a cap assembly coupled to the opening of the case sealing the case. The electrode assembly may include a finishing tape on an outer surface of the electrode assembly between the case and the electrode assembly. The finishing tape may include a first substrate and a second substrate.

The finishing tape of the secondary battery may include a termination tape and a bottom tape. In an embodiment, the bottom tape may cover a bottom of the electrode assembly.

According to an embodiment, a height of the finishing tape may be one third (⅓) or less of a height of the electrode assembly.

The second substrate of the finishing tape may be a polystyrene or oriented polystyrene material. The first substrate of the finishing tape may be a polyethylene material.

The first substrate of the finishing tape may at a surface of the finishing tape contacting the outer surface of the electrode assembly.

The second substrate of the finishing tape may at a surface of the finishing tape contacting the case.

The secondary battery may further include an adhesive layer between the first substrate and the second substrate and/or on a surface between the first substrate and the electrode assembly contacting the outer surface of the electrode assembly.

The adhesive layer of the secondary battery may be an acrylic material.

The adhesive layer may have a thickness of 4 micrometers ($\mu m$) or less.

The first substrate may have a thickness ranging from approximately 5 micrometers ($\mu m$) to approximately 7 micrometers ($\mu m$).

The finishing tape may have a thickness of at least 10 micrometers ($\mu m$).

The electrode assembly of the secondary battery may include a stacked structure having a positive electrode plate, a negative electrode plate, and a separator between the positive and negative electrode plates, the electrode assembly being wound in a roll and defining a termination line where the wound electrode assembly terminates, and wherein the finishing tape is affixed to the electrode assembly at the termination line.

The secondary battery may further include an insulation case between the electrode assembly and the cap assembly.

The finishing tape of the secondary battery may be a material configured to react with an electrolytic solution of the electrode assembly in the case resulting in the finishing tape having adhesive properties configured to fix the electrode assembly inside the case.

The first substrate of the finishing tape may be a base film, and the second substrate may be a material configured to react with the electrolytic solution of the electrode assembly resulting in the second substrate having adhesive properties.

The cap assembly of the secondary battery may include a cap plate coupled to the opening of the case. The cap plate may have a first opening accommodating an insulation gasket and an electrode terminal. A bottom surface of the cap plate may be coupled to an insulation plate, the insulation plate having a second opening accommodating the electrode terminal, which extends through the first opening of the cap plate. A bottom surface of the insulation plate may be coupled to a terminal plate, the terminal plate having a third opening accommodating the electrode terminal, which extends through the first opening of the cap plate and the second opening of the insulation plate.

Additional aspects and/or advantages of the invention will be set forth in part in the description which follows and, in part, will be obvious from the description, or may be learned by practice of the invention, or as appreciated by those skilled in the art.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, examples of embodiments of the invention will be described in detail with reference to the accompanying drawings such that they can readily be made and used by those skilled in the art.

Figure 1:
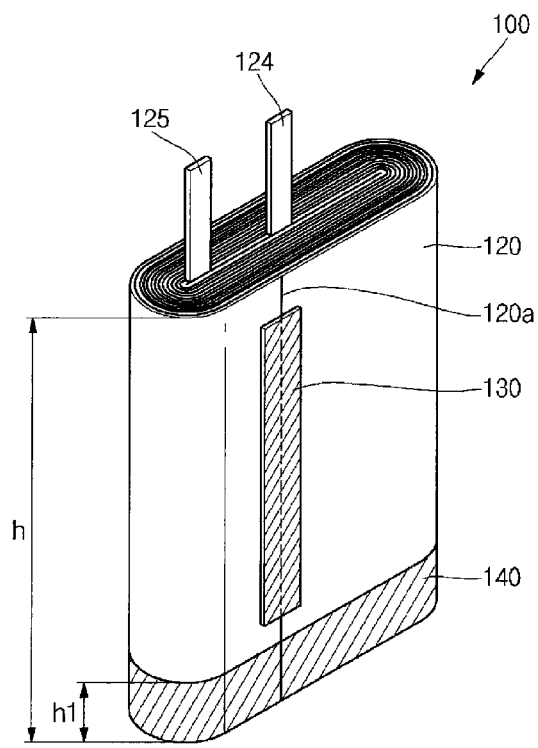
FIG. 1 is a perspective view of a secondary battery according to an embodiment of the present invention.
Figure 2:
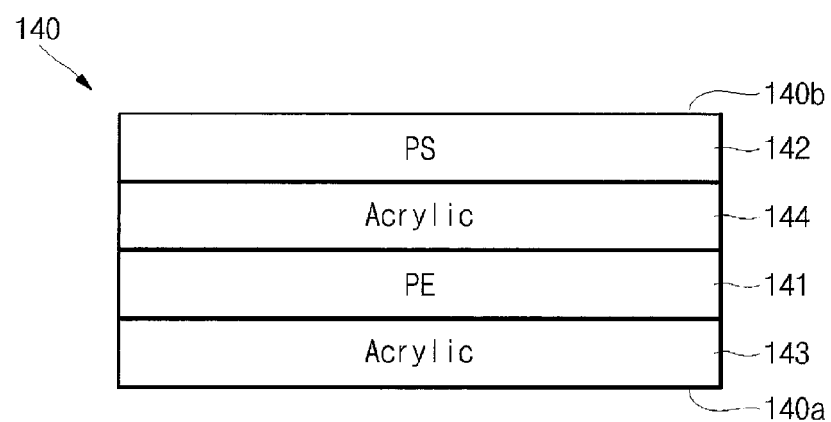
FIG. 2 is a schematic diagram illustrating a structure of a finishing tape of the secondary battery shown in FIG. 1.
Figure 3:
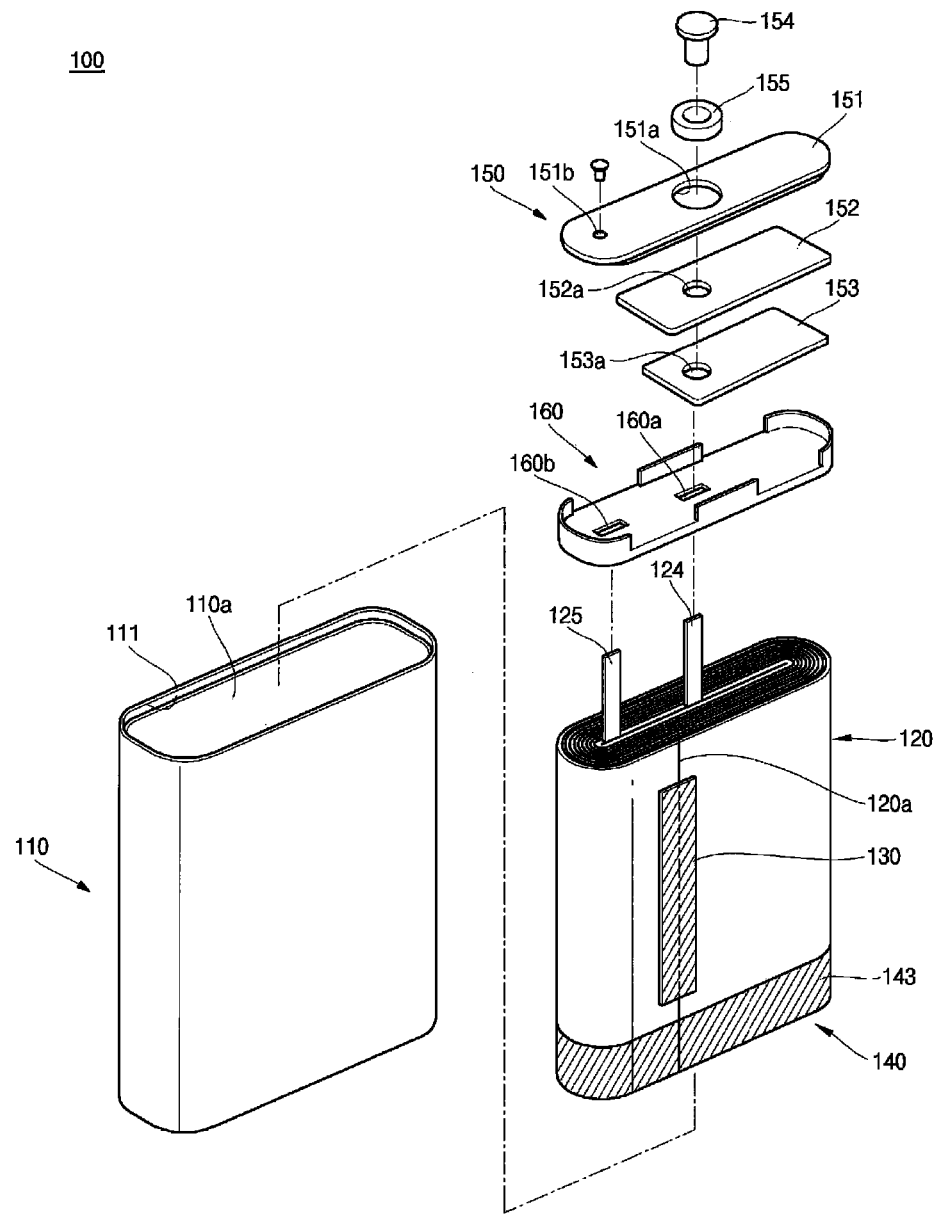
FIG. 3 is an exploded perspective view of the secondary battery shown in FIG. 1 with a cap assembly and a case.

FIG. 1 is a perspective view of a secondary battery according to an embodiment of the present invention, FIG. 2 is a schematic diagram illustrating a structure of a finishing tape i of the secondary battery shown in FIG. 1, and FIG. 3 is an exploded perspective view of a secondary battery shown in FIG. 1 with a cap assembly and a case.

Referring to FIGS. 1 and 2, the secondary battery 100 according to this embodiment includes a case 110, an electrode assembly 120, finishing tapes 130 and 140, and a cap assembly 150. In addition, the secondary battery 100 may include an insulation case 160 between the electrode assembly 120 and the cap assembly 150.

In an embodiment, the case 110 is substantially hexahedral shaped. The case 110, according to the embodiment shown in FIGS. 1-3, has an internal space and an opening 110a. The case 110 may be made of aluminum (Al), iron (Fe), or an alloy thereof. In addition, the inner surface of the case 110 may include insulation. The case 110 may have a groove 111 along its top periphery configured to accommodate the insulation case 160 placed within the groove 111. The electrode assembly 120 along with an electrolytic solution may be accommodated in the internal space of the case 110, according to an embodiment. The electrolytic solution may be an organic liquid containing a salt-injection allowing lithium ions to move between positive and negative electrode plates 121 and 122 of the electrode assembly 120, and may include a non-aqueous organic electrolytic solution having a lithium salt, such as $LiPF_6$, $LiBF_4$, or $LiClO_4$, and a high-purity organic solvent mixed therein, or a polymer electrolytic solution having a polymer electrolyte.

The electrode assembly 120 according to an embodiment is accommodated in the internal space of the case 110. The electrode assembly 120 according to this embodiment includes a positive electrode plate 121 coated with a positive active material (e.g., lithium cobalt oxide ($LiCoO_2$)), a negative electrode plate 122 coated with a negative active material (e.g., graphite), and a separator 123 positioned between the positive electrode plate 121 and the negative electrode plate 122 to prevent an electrical short-circuit and to allow the lithium ions to move between the positive and negative electrode plates 121 and 122. The electrode assembly 120 may be formed by winding a stacked structure of the positive electrode plate 121, the separator 123, and the negative electrode plate 122 multiple times in a jelly-roll-like configuration. In this embodiment, the positive electrode plate 121 may be made of a foil material such as an aluminum (Al) foil, the negative electrode plate 122 may be made of a foil material such as a copper (Cu) foil, and the separator 123 may be made of polyethylene (PE) or polypropylene (PP) material.

In an embodiment, an upwardly extending positive electrode lead 125 is connected to the positive electrode plate 121, and an upwardly extending negative electrode lead 124 is connected to the negative electrode plate 122. In this embodiment, the positive electrode lead 125 may be made of aluminum (Al), and the negative electrode lead 124 may be made of nickel (Ni).

As described above, the electrolytic solution may be injected into the case 110. During recharging and discharging of the secondary battery 100, the electrolytic solution serves as a medium for moving the lithium ions generated by an electrochemical reaction taking place between the positive electrode plate 121 and the negative electrode plate 122 within the secondary battery 100.

The finishing tapes 130 and 140 may include a termination tape 130 placed along a termination line 120a at which winding of the electrode assembly 120 is completed, and a bottom tape 140 wrapped up from a bottom of the electrode assembly 120.

The electrode assembly 120 according to this embodiment may be wound in a circular configuration with the separator 123 between the positive electrode plate 121 and the negative electrode plate 122, and the termination tape 130 may be coupled to the electrode assembly 120 along the termination line 120a where winding of the electrode assembly 120 is completed, as shown in FIG. 1, thereby fixing or sealing the wound electrode assembly 120 to prevent it from unwinding. The termination tape 130 may be fixedly compressed to prevent the electrode assembly 120 from unwinding, allowing the electrode assembly 120 to be easily placed inside the case 110. The termination tape 130 may have the same structure as a conventional tape used for secondary batteries or electrode assemblies. In other embodiments, however, the termination tape 130 may have the same structure as the bottom tape 140, described in further detail below, or other similar structure as appreciated by those skilled in the art.

The bottom tape 140, according to embodiments of the present invention, may be configured to entirely wrap up from the bottom of the electrode assembly 120 to be positioned between the electrode assembly 120 and the case 110. The bottom tape 140 according to an embodiment may have a chemical reaction when it contacts the electrolytic solution accommodated in the case 110 such that the bottom tape 140 becomes adhesive, thereby fixing the electrode assembly 120 into the case 110 to prevent the electrode assembly 120 from moving around inside the case 110. In addition, the bottom tape 140 according to these embodiments prevents the bottom of the electrode assembly 120 from making direct contact with the case 110, thereby reducing the risk of an electrical short-circuit occurring in the secondary battery 100.

Further detail of the structure of the bottom tape 140 according to an embodiment is shown in FIG. 2. In this embodiment, the bottom tape 140 includes a first substrate 141 at a first surface 140a coupled to or contacting the electrode assembly 120, and a second substrate 142 at a second surface 140b coupled to or contacting the case 110.

In the embodiment shown in FIG. 2, the first substrate 141 may be made of a material that does not have a chemical reaction with or dissolve when it comes into contact with the electrolytic solution, but, rather, forms a base film. In some embodiments, the first substrate 141 may be made of polyethylene (PE) material. Accordingly, in these embodiments, the first substrate 141 prevents the electrode assembly 120 from making direct contact with the case 110, thereby reducing the risk of an electrical short-circuit from occurring in the secondary battery 100.

According to an embodiment, the second substrate 142 does have a chemical reaction when it comes into contact with the electrolytic solution, modifying the properties of the second substrate 142 to become adhesive. The second substrate 142 according to some embodiments may be made of polystyrene (PS) or oriented PS material. In these embodiments, after the second substrate 142 reacts with the electrolytic solution, the first substrate 141, acting as a base film, may become adhered to the case 110, thereby preventing the electrode assembly 120 from moving around in the case 110. Accordingly, it may be possible to prevent the electrode assembly 120 from being damaged due to external impacts on the case 110 or the secondary battery 100, itself.

In an embodiment, the bottom tape 140 may include a first adhesive layer 143 configured to attach the first substrate 141 to the electrode assembly 120, and a second adhesive layer 144 configured to attach the first substrate 141 and the second substrate 142 to each other. The first and second adhesive layers 143 and 144 may be made of an acryl acrylic material.

Therefore, the secondary battery 100 according to an embodiment of the present invention includes the first substrate 141 that may be made of a polyethylene (PE) material as part of the bottom tape 140 of the finishing tapes 130 and 140, and the second substrate 142 that may be made of a polystyrene (PS) or oriented PS material as part of the bottom tape 140 in contact with the case 110, the structure of the finishing tapes 130 and 140 thereby preventing an electrical short-circuit between the electrode assembly 120 and the case 110 while preventing the electrode assembly 120 from moving around in the case 110.

In an embodiment, where the electrolytic solution is injected into the electrode assembly 120, the first substrate 141 may be positioned to contact the electrode assembly 120, and the second substrate 142 may be positioned to face the inner surface of the case 110. However, the positions of the first substrate 141 and the second substrate 142 may be changed as recognized and appreciated by those skilled in the art.

A thickness of the bottom tape 140 may be 10 micrometers ($\mu$m) or greater, according to an embodiment. In embodiments where the thickness of the bottom tape 140 at least 10 $\mu$m, the bottom tape 140 may advantageously prevent the electrode assembly 120 from moving within the case 110 by fixing the position of the electrode assembly 120. In addition, the bottom tape 140 according to these embodiments may advantageously prevent an electrical short-circuit between the electrode assembly 120 and the case 110 by securing an appropriate thickness of the bottom tape 140.

In an embodiment, the first substrate 141 of the bottom tape 140 may have a thickness ranging from approximately 5 $\mu$m to approximately 7 $\mu$m. In embodiments where the thickness of the first substrate 141 is at least 5 $\mu$m, reliability in the insulating performance between the electrode assembly 120 and the case 110 using the first substrate 141 can be maintained. In addition, in embodiments where the thickness of the first substrate 141 is 7 $\mu$m or less, a capacity of the secondary battery 100 can be advantageously reached by increasing the capacity of the electrode assembly 120.

In an embodiment, each of the first adhesive layer 143 and the second adhesive layer 144 may have a thickness of 4 $\mu$s or less. Since the first adhesive layer 143 and the second adhesive layer 144 are coated, according to embodiments of the present invention, lower limits of thicknesses of the first adhesive layer 143 and the second adhesive layer 144 are not separately defined herein. In embodiments where the thickness of each of the first adhesive layer 143 and the second adhesive layer 144 is 4 $\mu$m or less, the capacity of the secondary battery 100 can be advantageously reached by increasing the capacity of the electrode assembly 120.

According to an embodiment of the present invention, a height h1 of the bottom tape 140 is one third (⅓) or less of a height h of the electrode assembly 120. In embodiments where the height h1 of the bottom tape 140 is less than one third (⅓) of the height h of the electrode assembly 120, the capacity of the electrode assembly 120 can be advantageously reached, and lithium ion exchange of the electrolytic solution can be advantageously achieved.

The cap assembly 150 according to an embodiment is coupled to a top of the case 110. The cap assembly 150 according to an embodiment includes a cap plate 151, an insulation plate 152, a terminal plate 153, an electrode terminal 154, an insulation gasket 155, and a plug 156.

The cap plate 151, according to an embodiment, is coupled to the case 110 and may be shaped as a plate having long sides and short sides. In an embodiment in which the cap plate 151 is coupled to the case 110, a periphery of the cap plate 151 may be sealed, for example welded, to the case 110. The cap plate 151, according to an embodiment, may have a first opening or electrode terminal opening 151a configured to receive and couple the electrode terminal 154 and insulation gasket 155, and an electrolyte injection opening 151b for injection of the electrolyte solution.

The insulation plate 152 according to an embodiment may be positioned at a lower portion of the cap plate 151. The insulation gasket 155 according to an embodiment is coupled to an insulation plate opening or a second opening 152a of the insulation plate 152. In an embodiment, a lower portion of the electrode terminal 154 penetrates the insulation plate opening or second opening 152a of the insulation plate 152.

The terminal plate 153 according to an embodiment may be positioned at a lower portion of the insulation plate 152. The electrode terminal 154 according to an embodiment is coupled to a terminal plate opening or a third opening 153a of the terminal plate 153, and the electrode terminal 154 may be electrically connected or coupled to the negative electrode lead 124.

A lower portion of the electrode terminal 154 according to an embodiment penetrates through the openings 151a and 152a in the cap plate 151 and the insulation plate 152, respectively, to be electrically connected or coupled to the negative electrode lead 124. The insulation gasket 155 according to these embodiments may be positioned between the electrode terminal 154 and the cap plate 151, thereby preventing the electrode terminal 154 from electrically contacting the cap plate 151.

The plug 156, according to an embodiment, is configured to correspond to an electrolyte injection opening 151b of the cap plate 151. Once the electrolytic solution is injected, the plug 156 may fixedly seal the cap plate 151 at the electrolyte injection opening 151b, thereby preventing the electrolytic solution from leaking.

The insulation case 160 according to an embodiment is coupled to a top of the electrode assembly 120, i.e., the opening 110a of the case 110. In an embodiment, the insulation case 160 may be coupled to the groove 111 of the case 110. Lead passage openings 160a and 160b in the insulation case 160 may allow the negative electrode lead 124 and the positive electrode lead 125 to penetrate the insulation case 160, as illustrated in the embodiment shown in FIG. 3.

Figure 4:
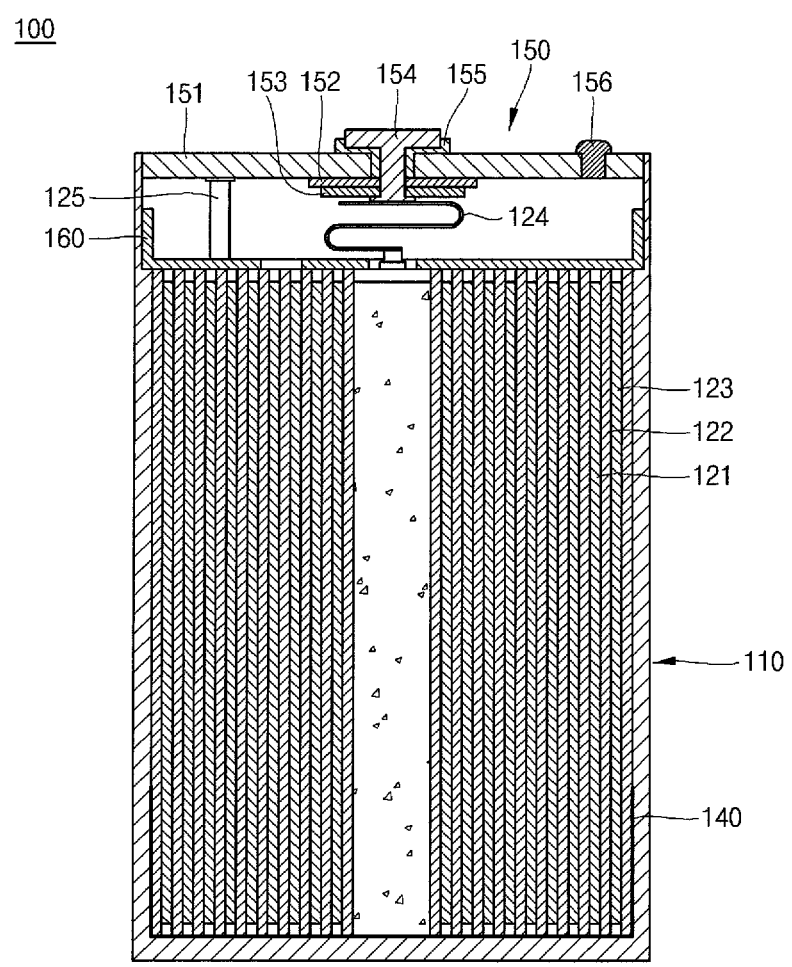
FIG. 4 is a cross-sectional view of the secondary battery shown in FIG. 3 in an assembled state.

FIG. 4 is a cross-sectional view of the secondary battery shown in FIG. 3 in an assembled state.

Referring to the embodiment shown in FIG. 4, in the secondary battery 100 having a finishing tape 130 or 140 according to an embodiment of the present invention, the electrode assembly 120 is accommodated in the case 110. In addition, the bottom tape 140 may be positioned between a bottom of the electrode assembly 120 and the case 110.

In an embodiment, as described above, in the bottom tape 140, the first substrate 141 is coupled or adhered to the electrode assembly 120, thereby preventing the electrode assembly 120 and the case 110 from being electrically short-circuited.

In another embodiment, as described above, the second substrate 142 is coupled or adhered to the case 110, thereby preventing the electrode assembly 120 from moving around in the case 110.

Although the secondary battery 100 according to exemplary embodiments of the present invention has been described in detail above, it should be understood that many variations and modifications of the basic inventive concept herein described, which may appear to those skilled in the art, will still fall within the spirit and scope of the present invention.

What is claimed is:

1. A secondary battery comprising:
a case having an opening defining an internal space;
a wound electrode assembly in the internal space of the case;
a cap assembly coupled to the opening of the case and sealing the case,
a termination tape extending across an end of the wound electrode assembly and being located on an outer surface of the electrode assembly between the case and the electrode assembly; and
a bottom tape entirely covering a bottom of the electrode assembly and directly fixing the electrode assembly to a bottom of the case, wherein the termination tape and the bottom tape comprises comprise a first substrate and a second substrate.

2. The secondary battery of claim 1, wherein a height of the bottom tape is one third (⅓) or less of a height of the electrode assembly.

3. The secondary battery of claim 1, wherein the second substrate comprises polystyrene or oriented polystyrene.

4. The secondary battery of claim 1, wherein the first substrate comprises polyethylene.

5. The secondary battery of claim 1, wherein the first substrate is at a surface of the bottom tape or the termination tape contacting the outer surface of the electrode assembly.

6. The secondary battery of claim 5, wherein the second substrate is at a surface of the bottom tape or the termination tape contacting the case.

7. The secondary battery of claim 5, further comprising an adhesive layer between the first substrate and the second substrate or on a surface between the first substrate and the electrode assembly contacting the outer surface of the electrode assembly.

8. The secondary battery of claim 7, wherein the adhesive layer comprises an acrylic.

9. The secondary battery of claim 8, wherein the adhesive layer has a thickness of 4 micrometers (µm) or less.

10. The secondary battery of claim 1, wherein the first substrate has a thickness ranging from approximately 5 micrometers (µm) to approximately 7 micrometers (µm).

11. The secondary battery of claim 1, wherein the bottom tape or the termination tape has a thickness of at least 10 micrometers (µm).

12. The secondary battery of claim 1, wherein the electrode assembly comprises a stacked structure comprising a positive electrode plate, a negative electrode plate, and a separator between the positive and negative electrode plates, the electrode assembly being wound in a roll and defining a termination line where the wound electrode assembly terminates, and wherein the termination tape is affixed to the electrode assembly at the termination line.

13. The secondary battery of claim 1, wherein the secondary battery further comprises an insulation case between the electrode assembly and the cap assembly.

14. The secondary battery of claim 1, wherein the termination tape and the bottom tape comprise a material that reacts with an electrolytic solution of the electrode assembly in the case resulting in the termination tape and the bottom tape having adhesive properties fixing the electrode assembly inside the case.

15. The secondary battery of claim 14, wherein the first substrate comprises a base film, and the second substrate comprises a material that reacts with the electrolytic solution of the electrode assembly resulting in the second substrate having adhesive properties.

16. The secondary battery of claim 1, wherein the cap assembly comprises a cap plate coupled to the opening of the case,
wherein the cap plate has a first opening accommodating an insulation gasket and the electrode terminal,
wherein a bottom surface of the cap plate is coupled to an insulation plate, the insulation plate having a second opening accommodating the electrode terminal, which extends through the first opening of the cap plate, and
wherein a bottom surface of the insulation plate is coupled to a terminal plate, the terminal plate having a third opening accommodating the electrode terminal, which extends through the first opening of the cap plate and the second opening of the insulation plate.

* * * * *